United States Patent [19]
Kool

[11] Patent Number: 5,344,558
[45] Date of Patent: Sep. 6, 1994

[54] WATER FILTER CARTRIDGE

[75] Inventor: Dennis J. Kool, Kentwood, Mich.

[73] Assignee: Amway Corporation, Ada, Mich.

[21] Appl. No.: 17,773

[22] Filed: Feb. 16, 1993

[51] Int. Cl.$^5$ ............................................ B01D 35/153
[52] U.S. Cl. ................................... 210/117; 210/136;
210/232; 210/282; 210/443
[58] Field of Search ............... 210/117, 136, 440, 443,
210/232, 238, 264, 287, 119, 282, 445

[56] References Cited

U.S. PATENT DOCUMENTS

| | | | |
|---|---|---|---|
| 4,454,036 | 6/1984 | Suzuki | 210/117 |
| 4,557,829 | 12/1985 | Fields | 210/443 |
| 4,959,141 | 9/1990 | Anderson | 210/440 |
| 4,992,166 | 2/1991 | Lowsky et al. | 210/443 |
| 5,045,189 | 9/1991 | Van der Vos et al. | 210/440 |
| 5,130,020 | 7/1992 | Meckstroth | 210/264 |

*Primary Examiner*—Frank Spear
*Assistant Examiner*—W. L. Walker
*Attorney, Agent, or Firm*—Michael E. Mohr; Jill M. Beckman

[57] ABSTRACT

A self-contained, disposable water filter cartridge for a water treatment system for treatment of potable water has one-way ball check valves at the water inlet and water outlet to the cartridge. The generally cylindrical water filter cartridge is generally spherical on one end while substantially planar on the other end and is of a welded plastic construction. Asymmetrical lugs radially disposed about the periphery of the planar end are adapted to mate with an apertured deck of a water treatment system.

19 Claims, 3 Drawing Sheets

WATER FILTER CARTRIDGE

BACKGROUND OF THE INVENTION

The present invention is generally directed to water filters used to filter chemicals and water-laden particulates from potable water. More particularly, the present invention is directed to a self-contained replaceable water filter cartridge assembly having its own carbon block water filter pressure vessel and inlet and outlet ports which are provided with one-way check valves. The water filter cartridge of the present invention is designed to be disposable and easily replaced by the user. The one-way check valves disposed within the inlet and outlet ports of the cartridge of the present invention are designed to prevent reflux of contaminated water into the inlet water supply and prevent leakage of water from the inlet and outlet ports of the cartridge during replacement.

Current domestic water treatment systems for the treatment of potable water generally employ a cylindrical pressure vessel having a removable base. The base is provided with inlet and outlet ports on the bottom thereof and the top end of the base is adapted with a threaded male member to threadingly receive a generally cylindrical water filter thereon. With the filter elements secured upon the base, the threaded male member is in fluid communication with both the outlet port on the bottom of the base and the filter element itself. When the base is secured to the shell portion of the pressure vessel, the inlet port is in communication with an area defined by the space between the water filter element and the inside of the pressure vessel housing shell.

In operation, the inlet port is plumbed to a faucet or similar device which, when opened, allows water to flow into the pressure vessel between the filter element and the inside of the pressure vessel shell wherein water is forced through the filter element via pressure. The carbon filter element generally has a non-porous plastic cap on the end located distally from the base and, proximate to the base, has a non-porous cap having female threads disposed therein adapted to threadingly attach to the threaded male member of the base. However, the filter, having a hollow core lined with a porous plastic material, will allow water to flow therethrough under line pressure through the porous plastic in the hollow core and continue its flow out through the outlet port. The outlet port of the filter cartridge is generally either plumbed to a spigot from which the user can draw water for consumption or to a second stage of water treatment such as an ultraviolet light chamber for sterilizing bacteria and other organisms not arrested during the filtering stage.

Domestic water filter systems periodically require maintenance, particularly for the purpose of replacing the filter element. In order for the consumer to access the filter element for replacement, the consumer must first shut off the water supply and disconnect the pressure vessel from its inlet and outlet port plumbing fitments. Removal and replacement of the filter often requires an assortment of tools, both for the plumbing fitments from the inlet and outlet ports of the pressure vessel and to open the pressure vessel for access to the filter. Other systems provide easier access to the water filter by utilizing quick-release fitments and by adapting the pressure vessel to be opened by hand. In any case, if the filter had been in use prior to disassembly of the pressure vessel, both filtered and non-filtered water will remain inside the filter and pressure vessel during maintenance. Once the inlet and outlet port plumbing fitments are disconnected from the pressure vessel, filtered water will spill out of the pressure vessel outlet. While this is messy, and even dangerous, particularly when any electronic elements are incorporated into the water treatment system, even more critical is the fact that unfiltered water will spill from the pressure vessel inlet port, thereby risking contamination of components of the water treatment system designed to only handle filtered water.

SUMMARY OF THE INVENTION

According to the present invention these and other problems in the related art are solved by provision of a self-contained water filter cartridge featuring a pressure vessel being generally cylindrical in shape and having a generally spherical end and a generally flat base adapted with a molded inlet and outlet port in fluid communication with the interior of the pressure vessel. The water filter cartridge of the present invention is of a welded construction featuring the following assembled components: A pressure vessel shell; a base having an inlet port molded therein and a protruding male member having an annular gasket lands; an elastomeric O-ring gasket adapted to be disposed upon the annular gasket lands and the molded protruding outlet port; an elastomeric outlet ball check valve disposed adjacent and upstream from the outlet port; an elastomeric inlet ball check valve placed adjacent and upstream from the inlet port; a base plate having through ports which correspond with the inlet and outlet ports of the base; a male externally threaded member adapted to be threadingly connected to a filter element; an elastomeric annular compression gasket adapted to effect a seal between the externally threaded male member and the filter element; a filter element; a pressure vessel shell having a spherical end; and asymmetrical lugs disposed radially from the base for mounting upon a water treatment apparatus correspondingly adapted to receive such lugs.

The water filter cartridge of the present invention can be adapted to have its outlet port plumbed to either a spigot or a second stage of a water treatment system such as an ultraviolet treatment stage. For purposes of this disclosure, the present invention is employed as a filtering stage to an ultraviolet-type water treatment system wherein the second stage is the sterilization of organisms in filtered water by ultraviolet light.

As assembled, a threaded nipple to which the filter cartridge is attached is welded to the filter base and permanently encloses the ball check valve at the outlet port. The filter element is threadingly secured onto the threaded male member, capturing the inlet check ball, with the compression gasket effecting a seal therebetween. This entire assembly is placed inside of the pressure vessel shell and welded thereto at the cartridge base in watertight fashion. This assemblage yields a self-contained, maintenance-free, disposable water filter cartridge able to withstand internal pressures of 0.34 mpa thereby exceeding the minimum performance criteria of the National Sanitation Foundation Standard No. 53 for pressure vessels used in the treatment of potable water.

DETAILED DESCRIPTION OF THE PREFERRED EMBODIMENT

Figure 1:
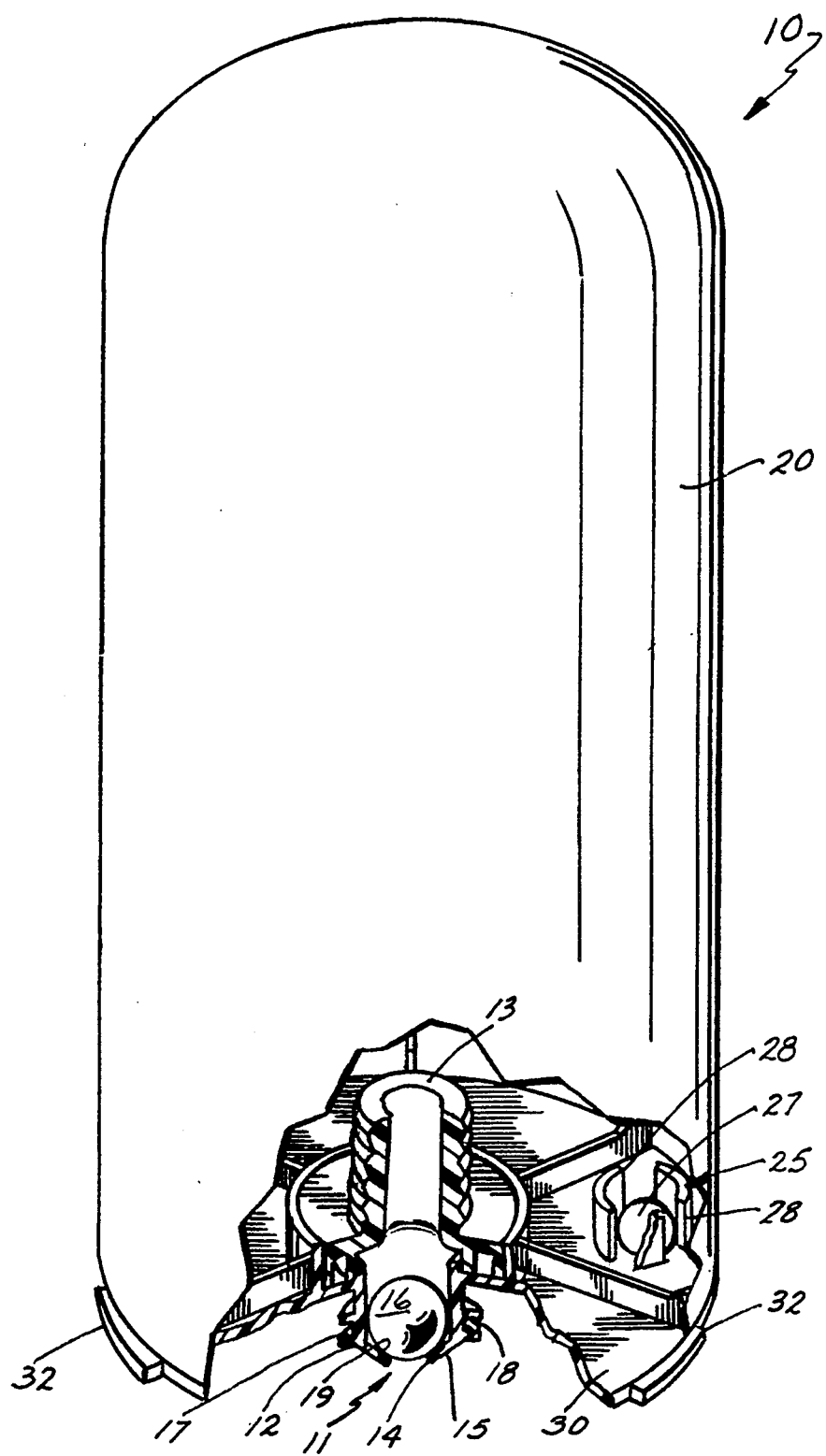
FIG. 1 is a perspective view partially in section of the water filter cartridge of the present invention taken along section line II of FIG. 3.
Figure 2:
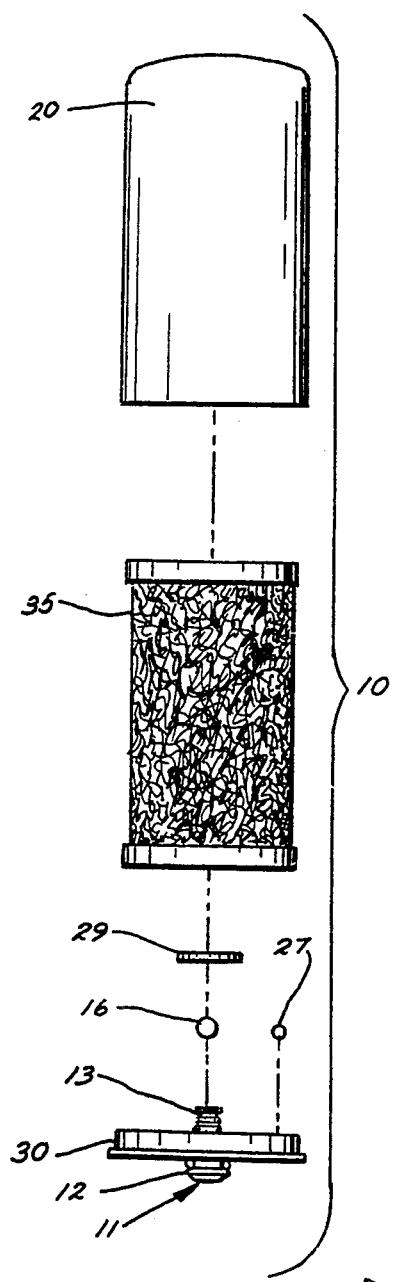
FIG. 2 is an exploded elevational view of the water filter cartridge of the present invention.
Figure 3:
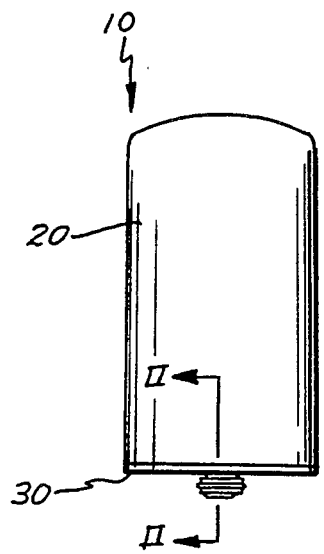
FIG. 3 is an elevational view of the water filter cartridge of the present invention.

With reference to the figures, and with particular reference to FIG. 1, which is partially in section, and FIG. 2, which is exploded, a water filter cartridge is shown generally at 10. Water filter cartridge 10 is made up of two major sections: a pressure vessel shell 20 which is substantially cylindrical in shape and generally spherical at one end and a pressure vessel base 30 which is generally circular and planar in shape. Disposed coaxially with pressure vessel base 30 is an outlet port shown in section generally at 11 in FIG. 1. The main components of outlet port 11 are a hollow, generally cylindrical outlet port nipple 12 which is disposed in coaxial relation to outlet port 11 and extends distally from pressure vessel shell 20. A threaded nipple 13 is disposed proximate to and within pressure vessel shell 20. Threaded nipple 13 is hollow and in fluid communication with pressure vessel shell 20 and outlet port nipple 12. One end of outlet port nipple 12 tapers outwardly and terminates at a distal restricted opening 14 thereby defining a beveled surface 15 between the point at which outlet port nipple 12 begins to taper and the perimeter of distal restricted opening 14. The inner portion of beveled surface 15 defines an annular sealing wall 19.

Disposed within outlet port nipple 12 is a first, elastomeric outlet ball check valve 16 which rests in its normally closed position in sealing relationship with annular sealing wall 19. Disposed upon the outside diameter of outlet port nipple 12 between pressure vessel base 30 and beveled surface 15 is an annular O-ring gasket lands 17 having disposed therein an elastomeric outlet port O-ring gasket 18, shown more clearly in section in FIGS. 1 and 4.

Figure 4:
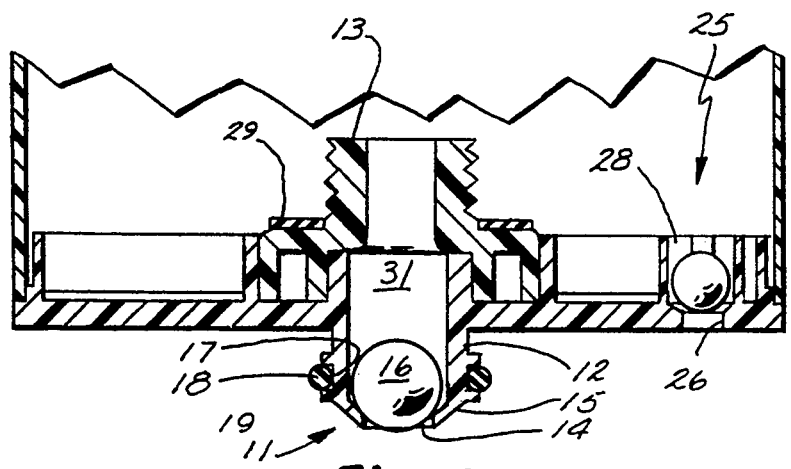
FIG. 4 is a broken sectional view of the water filter cartridge of the present invention.

With reference particularly to FIGS. 1 and 4, adjacent from outlet port 11 and disposed within pressure vessel base 30 is an inlet port shown generally at 25 shown in section. With reference particularly to FIG. 4, a beveled inlet opening 26 provides a sealing surface for a second elastomeric inlet check ball valve 27. A sectioned inlet valve cup 28 which is disposed upon pressure vessel base 30 adjacent to threaded nipple 13 retains second ball check valve 27 upon the beveled surface of beveled inlet opening 26. Second ball check valve 27 is held in place by gravity and is unseated by water pressure as water enters beveled inlet opening 26 thereby allowing water to flow into sectioned inlet valve cup 28, between the sections thereof and thereafter into pressure vessel shell 20 for filtering.

With particular reference to FIG. 4, inlet ball check valve 27 is prevented from leaving the confines of inlet valve cup 28 by a filter 35 which, when threadingly secured upon threaded nipple 13, will abut the opening of sectioned inlet valve cup 28 thereby substantially confining inlet ball check valve 27 therein. Outlet ball check valve 16 is captured within outlet port nipple 12 by placement of threaded nipple 13 at the one end thereof.

Figure 5:
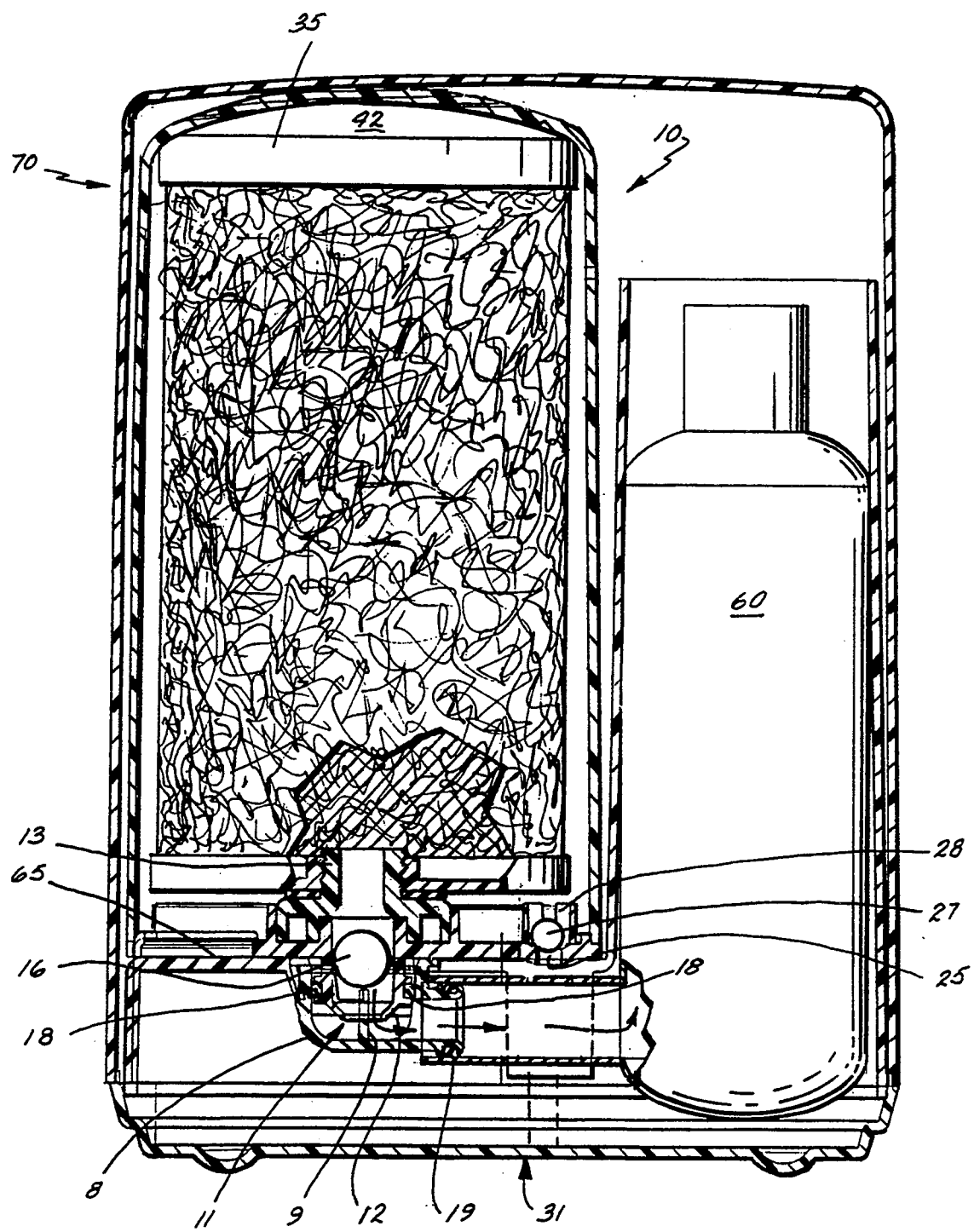
FIG. 5 is a sectional view of a water treatment system incorporating the water filter cartridge of the present invention also shown in section.

With reference FIG. 5, sectioned inlet valve cup 28, beveled inlet opening 26 and second ball check valve 27 all are in fluid communication with a filter inlet water passage 31 whereby when water pressure is applied at beveled inlet opening 26, the pressure will unseat second ball check valve 27 within sectioned inlet valve cup 28 exiting between the sections thereof into pressure vessel shell 20. Unfiltered water, after having flowed from inlet port 25 into pressure vessel shell 20, will fill a space 42 defined by the area between the outside perimeter of filter 35 in the inside wall of pressure vessel shell 20 where, under pressure, water will enter filter 35 and flow downward and exit outlet port 11.

With continued reference to FIG. 5, the path of filtered water exiting outlet port 11 is illustrated by the arrows flowing toward and into an ultraviolet treatment chamber 60. Within ultraviolet treatment chamber 60, filtered water is exposed to ultraviolet light thereby sterilizing and killing microorganisms after which the water will exit ultraviolet treatment chamber 60 and ultimately exit a faucet spigot (not shown) to be consumed by the user.

With reference now to FIG. 1, a set of two or more asymmetrical lugs 32 protrude radially from the perimeter of pressure vessel base 30 and are adapted to register with apertures or corresponding hooks (not shown) disposed upon a deck 65 shown in FIG. 5 to secure cartridge 10 in the correct position within a water treatment system shown generally at 70 in FIG. 5. However, water treatment system 70 and deck 65 are shown merely for purposes of reference rather than as a preferred embodiment of the filter cartridge 10 of the present invention. It is understood that filter cartridge 10, through minor modification perhaps to outlet port 11 and asymmetrical lugs 32, may be adapted to be accommodated by any number of water treatment systems of different configurations without departing from the spirit of the present invention.

Referring to FIG. 5, an outlet cup 8, which is disposed in deck 65 of water treatment system 70, is in fluid communication with ultraviolet treatment chamber 60 and is adapted to receive outlet port nipple 12 while O-ring gasket 18 creates a fluid-tight seal therewith. As outlet port nipple 12 is inserted into outlet cup 8, a vertical pin 9 disposed within outlet cup 8 coaxially therewith will enter outlet nipple 12 thereby making contact with and unseating first ball check valve 16 from annular sealing wall 19. In order to register filter cartridge 10 correctly upon deck 65 of water treatment system 70, the user will then hand turn filter cartridge 10 until asymmetrical lugs 32 register with corresponding hooks (not shown) in the correct position upon deck 65. With first ball check valve 16 now unseated, the outlet is open allowing filtered water to flow therethrough from the filter cartridge 10 through outlet cup 8 and into ultraviolet treatment chamber 60 where the water is thereafter discharged from a spigot (not shown).

The deck 65 of water treatment system 70 may either be plumbed to a spigot from which the consumer may draw water or, preferably, to the second stage described above wherein the water is treated within ultraviolet treatment chamber 60.

Continuing with FIG. 5, during operation, a port on deck 65 of water treatment system 70 will be plumbed to pressurized water and in fluid communication with inlet port 25. When water pressure is applied, the pressure will unseat second ball check valve 27 allowing water to enter inlet port 25 between the sections of sectioned cup 28 into pressure vessel shell 20 filling space 42. Under pressure the water will, via osmosis, enter filter 35 wicking through the filter and, via gravity, flow downward through threaded nipple 13 and outlet port 11. With filter cartridge 10 in place, pin 9 is unseating outlet ball check valve 16 thereby allowing the water to flow through outlet port 11 into cup 8 and thereafter into a faucet spigot or in the preferred embodiment into ultraviolet treatment chamber 60.

When the user needs to remove filter cartridge 10 for maintenance, the user will rotate cartridge 10 by hand until asymmetrical lugs 32, as shown at FIG. 1, are free from corresponding hooks on deck 65 of water treatment system 70, then lift the entire filter cartridge 10 away from deck 65 thus drawing outlet nipple 12 out of cup 8 allowing outlet ball check valve 16 to seat against annular sealing wall 19 thus preventing water from leaking out of outlet port 11. At the same time, since water pressure is no longer applied to inlet ball check valve 27, it will remain in its normally closed position sealingly contacting beveled inlet opening 26, as shown at FIG. 4, thus preventing unfiltered water from spilling as the cartridge is removed from deck 65. Installation of a new filter cartridge 10 requires the exact reverse of the above procedure.

With reference now to FIG. 2, filter cartridge 10 of the present invention is of a generally welded construction whereby during assembly, filter 35 is threadingly secured upon threaded nipple 13 on pressure vessel base 30 and sealed by a flat gasket 29. Pressure vessel shell 20 and pressure vessel base 30 are then securely attached to one another by welding or otherwise securely adhering the two sections together for a water-tight seal which offers a construction that meets or exceeds National Sanitation Foundation Standard No. 53.

The preferred material for all of the molded portions of filter cartridge 10 is Noryl PX 1543 which is a modified polyphenyleneoxide which allows the cartridge to withstand 10,000 cycles of pressure between 0 and 50 psi and hydrostatic pressure of 150 psi for 15 minutes which meets or exceeds the National Sanitation Foundation Standard No. 53 referred to above.

Thus, a compact and very strong disposable water filter cartridge is obtained which is relatively inexpensive to manufacture and for the consumer to purchase as a replacement cartridge in a water treatment system.

The above description is that of a preferred embodiment of the invention. Various alterations and changes can be made without departing from the spirit and broader aspects of the invention as set forth in the appended claims which are to be interpreted in accordance with the principles of patent law, including the doctrine of equivalents.

The embodiments of the invention in which an exclusive property or privilege is claimed are defined as follows:

1. In a water filter cartridge, the combination comprising:
   a substantially cylindrical pressure vessel;
   said pressure vessel having a substantially spherical first end and a generally planar second end;
   said second end comprising an outlet and an inlet in fluid communication with said pressure vessel:
   one of said outlet and said inlet being disposed coaxially with said pressure vessel:
   the other of said outlet and said inlet being disposed adjacent thereto;
   said outlet further comprising a first ball check valve adapted to block said outlet when said water filter cartridge is not in service;
   said inlet further comprising a second ball check valve adapted to allow water to flow in the direction of said first end of said pressure vessel only;
   said second end further comprises at least two asymmetrical lugs radially disposed about its periphery and adapted to mate with an apertured deck of a water treatment system to hold said water filter cartridge in place;
   said outlet further comprises a generally cylindrical hollow nipple disposed coaxially to said outlet, a major portion thereof extending from said second end and a minor portion thereof extending toward said first end; and
   said hollow nipple further comprises an open terminus defining a restricted opening.

2. The restricted opening of claim 1 wherein said restricted opening further comprises an inner surface defining an annular sealing wall wherein said first ball check valve is sealingly disposed.

3. The water filter cartridge of claim 2 wherein said first ball check valve is adapted to be moved away from said annular sealing wall by a pin disposed in a water treatment system port.

4. The water filter cartridge of claim 1 wherein said hollow nipple further comprises a radial gasket lands disposed about the outer diameter thereof having a gasket disposed thereon.

5. In a water filter cartridge, the combination comprising:
   a substantially cylindrical pressure vessel;
   said pressure vessel having a substantially spherical first end and a generally planar second end;
   said second end comprising an outlet and an inlet in fluid communication with said pressure vessel;
   one of said outlet and said inlet being disposed coaxially with said pressure vessel;
   the other of said outlet and said inlet being disposed adjacent thereto;
   said outlet further comprising a first ball check valve adapted to block said outlet when said water filter cartridge is not in service;
   said inlet further comprising a second ball check valve adapted to allow water to flow in the direction of said first end of said pressure vessel only;
   said second end further comprises at least two asymmetrical lugs radially disposed about its periphery and adapted to mate with an apertured deck of a water treatment system to hold said water filter cartridge in place;
   said inlet further comprises a cup projecting inwardly in a proximate direction in relation to said second end;
   said cup having sectional inner walls in fluid communication with said inlet port and said pressure vessel shell;
   said cup having a major diameter, a beveled sealing surface located distally from said major diameter termination in a generally cylindrical port having a minor diameter; and said cup having disposed therein said second ball check valve in sealing contact with said beveled sealing surface.

6. The water filter cartridge of claim 5 wherein said second ball check valve is adapted to be moved away from said beveled sealing surface by water pressure.

7. In a water filter cartridge, the combination comprising:

a generally cylindrical pressure vessel;

said pressure vessel comprising a pressure vessel shell and a pressure vessel base;

said pressure vessel shell having an open first end and a generally spherical second end;

said pressure vessel further comprising a generally circular and planar pressure vessel base;

said pressure vessel base comprising a pressure vessel outlet disposed coaxially in relation to the circumference of said pressure vessel base extending therethrough in fluid communication with said pressure vessel shell;

said pressure vessel base further comprising a pressure vessel inlet disposed adjacent said pressure vessel outlet and extending therethrough in fluid communication with said pressure vessel shell;

said pressure vessel outlet comprising a generally cylindrical hollow nipple disposed coaxially to said outlet, a major portion thereof extending from said second end and a minor portion thereof extending toward said first end;

said hollow nipple having an open terminus defining a restricted opening;

said restricted opening having an inner surface defining an annular sealing wall;

a first elastomeric spherical check valve disposed within said chamber in sealing relationship with said annular sealing wall;

said hollow nipple further comprising a radial gasket lands disposed about the outer diameter thereof having an elastomeric gasket disposed thereon;

said inlet comprising a cup projecting inwardly in a proximate direction in relation to said second end;

said cup having sectional inner walls in fluid communication with said inlet port and said pressure vessel shell;

said cup having a major diameter, a beveled sealing surface located distally from said major diameter terminating in a generally cylindrical port having a minor diameter;

said cup having disposed therein a second elastomeric spherical check valve in sealing relationship to said beveled sealing surface; and said pressure vessel base further comprising at least two asymmetrical lugs radially disposed about its periphery and adapted to mate with a pair of corresponding hooks on a deck of a water treatment system to hold said water filter cartridge in place.

8. The water filter cartridge of claim 7 wherein said first elastomeric spherical check valve is adapted to be moved away from said annular sealing wall by a pin disposed in a water treatment system port.

9. The water filter cartridge of claim 7 wherein said second elastomeric spherical check valve is adapted to be moved away from said beveled sealing surface by water pressure.

10. In a water filter cartridge, the combination comprising:

a substantially cylindrical pressure vessel; said pressure vessel having a substantially spherical first end and a generally planar second end;

said second end comprising an outlet and an inlet in fluid communication with said pressure vessel;

said outlet further comprising a normally closed first ball check valve;

said inlet further comprising a normally closed second ball check valve adapted to open upon the application of water pressure to said inlet; and means for engaging and opening said normally closed first ball check valve system when said water filter cartridge is mounted in a water treatment system.

11. The water filter cartridge of claim 10 wherein said outlet further comprises a generally cylindrical hollow nipple with a restricted opening disposed coaxially to said outlet, a major portion thereof extending from said second end and a minor portion thereof extending toward said first end.

12. The water filter cartridge of claim 11 wherein said restricted opening further comprises an inner surface defining an annular sealing wall wherein said first ball check valve is sealingly disposed in said normally closed position.

13. The water filter cartridge of claim 10 further comprising a water filter.

14. The water filter cartridge of claim 13 wherein said filter comprises fabric mesh and carbon.

15. The water filter cartridge of claim 10 wherein said first end further comprises a pressure vessel shell and said second end comprises a pressure vessel base.

16. The water filter cartridge of claim 15 wherein said pressure vessel shell and pressure vessel base are comprised of polyphenyleneoxide.

17. The water filter cartridge of claim 10 wherein said means for engaging and opening comprises a pin disposed on the deck of a water treatment system for dislodging a ball disposed in said normally closed first ball check valve.

18. The water filter cartridge of claim 10 wherein said second end further comprises at least two asymmetrical lugs radially disposed about its periphery and adapted to mate with an apertured deck of a water treatment system to hold said water filter cartridge in place.

19. A self-containing disposable filter cartridge comprising:

a substantially cylindrical pressure vessel;

said pressure vessel having a substantially spherical first end and a generally planar second end;

said second end comprising a normally closed inlet ball check valve and a normally closed outlet ball check valve; and wherein said normally closed inlet ball check valve opens upon application of water pressure and said normally closed outlet ball check valve opens upon engagement with a pin disposed on a water treatment system which receives said filter cartridge.

* * * * *